US006706822B2

(12) United States Patent
Guenther et al.

(10) Patent No.: US 6,706,822 B2
(45) Date of Patent: Mar. 16, 2004

(54) METHOD OF PRODUCING POLYETHYLENE RESINS FOR USE IN BLOW MOLDING

(75) Inventors: Gerhard K. Guenther, Seabrook, TX (US); Lea Ann Nairn, Friendswood, TX (US); Curt D. Clark, League City, TX (US); Ben W. Hicks, Shoreacres, TX (US); Ronald A. Tharappel, Missouri City, TX (US); Tim J. Coffy, Houston, TX (US)

(73) Assignee: Fina Technology, Inc., Houston, TX (US)

( * ) Notice: Subject to any disclaimer, the term of this patent is extended or adjusted under 35 U.S.C. 154(b) by 56 days.

(21) Appl. No.: 10/170,753

(22) Filed: Jun. 13, 2002

(65) Prior Publication Data

US 2003/0055170 A1 Mar. 20, 2003

Related U.S. Application Data

(62) Division of application No. 09/775,396, filed on Jan. 31, 2001.

(51) Int. Cl.$^7$ .................................................. C08F 8/00
(52) U.S. Cl. .............................. 525/333.7; 525/333.8; 525/333.9; 525/374; 525/376; 525/387
(58) Field of Search ..................... 525/333.7, 333.8, 525/333.9, 374, 376, 387

(56) References Cited

U.S. PATENT DOCUMENTS

| 5,141,995 A | * | 8/1992 | Komori et al. ............. 525/242 |
| 5,486,575 A | | 1/1996 | Shroff |
| 5,530,072 A | | 6/1996 | Shirodkar |
| 5,728,335 A | | 3/1998 | Neubauer |
| 5,962,598 A | | 10/1999 | Mack et al. |
| 6,114,486 A | | 9/2000 | Rowland et al. |

OTHER PUBLICATIONS

V.R. Kamath and L.H. Palys, Polyethylene Melt Flow Modification, RETEC Conference, 1990, pp. 1–7, Pocono Mountains, Pennsylvania.

K. Kirchner, Crosslinking of Plastics After Extrusion, pp. 489–497.

* cited by examiner

*Primary Examiner*—Bernard Lipman
(74) *Attorney, Agent, or Firm*—Grady K. Bergen

(57) ABSTRACT

A method of processing polyethylene for use as an extruded blow molding resin to improve the properties and processability thereof is accomplished by modifying a polyethylene resin having a molecular weight distribution (Mw/Mn) of less than about 10. The modification is carried out by the addition of a free radical initiator to the resin during extrusion of the resin to increase the rheological breadth of the polyethylene from about 10% to about 60% compared to unmodified polyethylene resin extruded under similar conditions. In another aspect of the invention, a polyethylene resin having higher melt index is processed to provide a desired final melt index by the addition of a free radical initiator where it would otherwise be necessary to utilize a resin having lower melt flow, and which is more difficult to process. Improvements in color can also be obtained.

15 Claims, No Drawings

METHOD OF PRODUCING POLYETHYLENE RESINS FOR USE IN BLOW MOLDING

This application is a division of pending U.S. patent application Ser. No. 09/775,396, filed Jan. 31, 2001, and entitled Method of Producing Polyethylene Resins for Use in Blow Molding.

TECHNICAL FIELD

The invention relates generally to the production of polyethylene resins, and particularly, to the production of polyethylene resins for use in blow molding applications.

BACKGROUND

Polyethylene has been used in the production of various blow molded products, such as bottles. Examples of such products include household industrial containers, such as bleach bottles, detergent bottles and the like. Blow molding is accomplished by extruding molten polyethylene resin as a parison or hollow tube into a mold cavity while simultaneously forcing air into the parison so that the parison expands, taking on the shape of the mold. The molten polyethylene cools within the mold until it solidifies to produce the desired molded product.

During blow molding, the polyethylene will typically expand or swell upon exiting the die of the extruder. Although some swelling of the extruded resin may be acceptable and even desirable, excessive swelling can result in defective products and production difficulties. Excessive parison swell can result in molded parts having flash in non-pinchoff areas and/or neck/tail flash which is difficult to trim. In general, more swell makes it more difficult to control the wall thickness of the parison for optimal wall thickness distribution of the products made. Too little swell can be detrimental as well, making it particularly important to control the degree of swell. When a resin exhibits too little swell, it can become difficult or impossible to properly fill out the extremities of the mold, such as the handle of a blow molded bottle. It is, therefore, desirable to control swelling in blow molding operations to within acceptable limits.

U.S. Pat. No. 5,486,575 discloses improving certain properties of chromium produced polyethylene blow molding resins through the addition of organic peroxides. The improvements were directed towards increasing the stress crack resistance of blow molded polyethylene bottles. The improved results were seen in polyethylene resins having a broad molecular weight distribution, i.e. $M_w/M_n$ being greater than 10. Although acceptable swell characteristics were achieved with respect to those polyethylene resins having the broad molecular weight distributions described, poor swell characteristics were observed for polyethylenes having more narrow molecular weight distributions.

Polyethylene resins produced with Ziegler-Natta catalysts have also been modified through the use of free radical initiators, such as oxygen, to improve the polymer properties. U.S. Pat. Nos. 5,728,335 and 5,962,598 discuss the modification of polyethylene resins used in films through such means. Ziegler-Natta produced polyethylene resins used in blow molding resins are typically bimodal resins wherein a low molecular weight polymer and a high molecular weight polymer are combined to provide a broad molecular weight distribution to improve the melt properties of the resin.

It is desirable to improve the swell characteristics of polyethylene blow molded resins having more narrow molecular weight distributions than has heretofore been achieved. It is also desirable to improve other properties of polyethylene resins and to improve upon the processability of such polyethylene resins, particularly those used in connection with blow molded products.

SUMMARY

A method of processing polyethylene, and the polyethylene produced by such method, for use as an extruded blow molding resin to improve the properties and processability thereof is provided. The method comprises modifying a polyethylene resin having a molecular weight distribution (Mw/Mn) of less than about 10 by the addition of a free radical initiator to the resin during extrusion of the resin to increase the Theological breadth of the polyethylene from about 10 to about 60% compared to unmodified polyethylene resin extruded under similar conditions.

In certain embodiments, the polyethylene resin may have a melt flow index of at least 1 or greater prior to extrusion. The modified polyethylene produced by such method may also have a YI value reduced by at least about 10% compared to unmodified polyethylene resin extruded under similar conditions.

The free radical initiator may be any source capable of generating a free radical. Examples include air, oxygen or peroxide, which may be added in the amount of from 5 to 100 ppm. The polyethylene resin may be a chromium-catalyst produced polyethylene. The polyethylene resin may also include polyethylene and ethylene copolymers of $C_3$ to $C_{10}$ alpha-olefins.

In another embodiment of the invention, a method of processing polyethylene resin having desired properties for use as a blow molding resin is provided. The method comprises selecting a first unextruded polyethylene resin having a first initial melt index that provides a desired final melt index after extrusion of the selected polyethylene resin. The first polyethylene resin is modified during extrusion with a selected amount of a free radical initiator so that the first polyethylene resin is modified to provide a modified melt index of the first polyethylene resin that is different from the desired final melt index after extrusion. A second unextruded polyethylene resin is selected having a desired initial melt index based upon the differences between the modified melt index and the desired final melt index to provide a second desired final melt index upon modification of the second polyethylene resin with the selected amount of the free radical initiator after extrusion. This second polyethylene is modified with the free radical initiator while the second polyethylene resin is in a molten state and extruded.

In certain embodiments, the first and second desired final melt indices may be substantially equal, and may be modified with the selected amount of free radical initiator. The desired initial melt index may be greater than the initial melt index of the first polyethylene resin, and the modified second polyethylene resin may have a greater theological breadth compared to the first polyethylene resin upon extrusion.

Additionally, the unmodified first polyethylene resin and the modified second polyethylene resin may have final melt indices after extrusion that are substantially the same, and wherein extruder pressures for the modified polyethylene resin are less than those for the unmodified polyethylene resin during extrusion.

In another aspect of the invention, a method of processing polyethylene for use as a n extruded blow molding resin to improve the color properties thereof is provided. The method comprises modifying a polyethylene resin by the addition of a free radical initiator to the resin during extrusion of the resin to obtain a polyethylene resin having a YI value reduced by at least about 10% compared to unmodified polyethylene resin extruded under similar conditions.

DETAILED DESCRIPTION

It has been found that by the addition of long-chain branching of polyethylene resins for use in blow molding applications by the utilization of a free radical initiator with the polyethylene prior to extrusion, improvements in the properties and processability of the resins can be achieved. The invention has particular application to those polyethylene resins having narrow molecular weight distributions. Improvements in the way of increased rheological breadth of the ethylene polymers are achieved. In particular, the Theological breadth of the polyethylene can be increased from about 10% to about 60% compared to unmodified polyethylene resin extruded under similar conditions. This directly bears on and results in improvements in the processability, as well as improvements in swell characteristics and other properties of the blow molded resin. Improvements in the color of the extruded polyethylene resin have also been observed by the addition of the free radical initiator.

The polyethylene used for blow molding applications may be polyethylene homopolymers or copolymers of ethylene and $C_3$–$C_{10}$ alpha-olefin monomers. When copolymers are used, the ethylene content will typically range from about 90 to about 100 mol %, with the balance being made up of the $C_3$–$C_{10}$ alpha olefin. The method of the invention has particular application in increasing the rheological breadth of polyethylene resins having a narrow molecular weight distribution MWD, which can be used in blow molding applications. Narrower MWD polyethylenes are typically used for film, sheet, fiber and injection molding applications where melt strength and processability is sacrificed for certain solid state properties and aesthetics. Broad MWD distribution resins are typically used in applications where melt strength, processability and solid state performance such as stress crack resistance are desired such as blow molding and pipe applications. The MWD can be described by means of the curve obtained by gel permeation chromatography. However, the MWD is generally described by what is known as the polydispersity index (D), which represents the ratio between the weight-average molecular weight and the number-average molecular weight ($M_w/M_n$), as defined by standard and well known GPC or SEC methods. The polyethylene resins used have a fluff melt index MI2 (MI using 2.16 kg—ASTM D1238) of at least 1.0 or greater, in particular, the present invention has application to those resins having an MI2 ranging from about 0.75 to about 2, more particularly from about 1.0 to about 1.3.

In the present invention, polyethylene having a molecular weight distribution ($M_w/M_n$) of less than about 10 were treated to improve the Theological breadth of polyethylene for use in blow molding applications. In particular, the method has application for the processing of polyethylene resins having a molecular weight distribution $M_w/M_n$ of from about 2 to about 9, and more particularly a $M_w/M_n$ from about 5 to about 8. As used herein, Theological breadth refers to breadth of the transition region between Newtonian and power-law type shear rate dependence of the viscosity. The Theological breadth is a function of the relaxation time distribution of the resin, which in turn is a function of the resin's molecular architecture. It is experimentally determined assuming Cox-Merz rule by fitting flow curves generated using linear-viscoelastic dynamic oscillatory frequency sweep experiments with a modified Carreau-Yasuda (CY) model, $$\eta = \eta_o [1 + (\lambda \dot{\gamma})^a]^{\frac{n-1}{a}} \quad (1)$$

where
$\eta$=viscosity (Pa s)
$\dot{\gamma}$=shear rate (1/s)
a=rheological breadth parameter [CY model parameter which describes the breadth of the transition region between Newtonian and power law behavior]
$\lambda$=relaxation time sec [CY model parameter which describes the location in time of the transition region]
$\eta_o$=zero shear viscosity (Pa s) [CY model parameter which defines the Newtonian plateau]
n=power law constant [CY model parameter which defines the final slope of the high shear rate region]

To facilitate model fitting, the power law constant (n) is held to a constant value (n=0.2). Experiments were carried out using a parallel plate geometry and strains within the linear viscoelastic regime over a frequency range of 0.1 to 316.2 sec$^{-1}$. Frequency sweeps were performed at three temperatures (170° C., 200° C. and 230° C.) and the data was shifted to form a mastercurve at 190° C. using known time-temperature superposition methods.

For resins with no differences in levels of long chain branching (LCB), it has been observed that the Theological breadth parameter (a) is inversely proportional to the breadth of the molecular weight distribution. Similarly, for samples which have no differences in the molecular weight distribution, the breadth parameter (a) has been found to be inversely proportional to the level of long chain branching. An increase in the rheological breadth of a resin is therefore seen as a decrease in the breadth parameter (a) value for that resin. This correlation is a consequence of the changes in the relaxation time distribution accompanying those changes in molecular architecture.

The present invention has application to those resins having moderate levels of long chain branching resulting from the polymerization process. The level of long chain branching is quantified in terms of the resins flow activation energy ($E_a$). The time dependent shifts (e.g., horizontal shift of modulus or stress versus frequency) required to form a mastercurve from the flow curves at 170° C., 200° C. and 230° C. are used to calculate the flow activation energy using the well known temperature dependence of the linear viscoelastic properties in the form of the Arrhenius equation, $$a_T = \exp\left(\frac{E_a}{R}\left(\frac{1}{273+T} - \frac{1}{273+T_o}\right)\right) \quad (2)$$

where
$E_a$=flow activation energy (kcal/mol)
T=temperature of the data being shifted
$T_o$=reference temperature
R=gas constant
$a_T$=shift factor required to superimpose the flow curves at each temperature to the reference temperature ($T_o$).

The flow activation energy is solved using the values of the shift factor required to overlap the flow curve at temperature (T) to that of the flow curve at temperature ($T_o$).

The flow activation energy ($E_a$) represents the activation energy barrier associated with the energy required to create a hole big enough for a molecule to translate into during flow. This general definition of ($E_a$) suggests its relationship or sensitivity to changes in molecular architecture such as those associated with changes in levels or types of long chain branching. The polyethylene used in the present invention may be that made using a chromium catalyst that has a fluff flow activation energy ($E_a$) in the range of 7.25+/−0.25 Kcal/mol, which represents a significant amount of long chain branching. A more linear polyethylene made using Ziegler-Natta type catalysts having a similar polydispersity has very low levels of long chain branching such that the fluff flow activation energy of 6.5+/−0.25.

The polyethylene is preferably that produced from chromium catalysts capable of producing the narrow molecular weight distribution polyethylene discussed above. The chromium catalysts that are used are those that are well known to those skilled in the art. Activated chromium catalysts on a silica or titanium oxide support are particularly well suited to the polymerization of ethylene for blow molding resins. Increased rheological breadth of polyethylene produced from other catalysts used in the polymerization of olefins, such as Ziegler-Natta, metallocene or late-transition metal catalysts can be obtained as well.

In the method of the invention, a free radical initiator is added to the polyethylene resin prior to extrusion. The free radical initiator, as used herein, is that which results in light crosslinking or branching of the polyethylene molecules. Such free radical initiators include peroxides, oxygen, air and azides. Radiation may also be used as the free radical initiator. The preferred free radical initiators, however, are peroxides, particularly the organic peroxides. Two classes of organic peroxides have been found to be particularly suitable. These are the dialkyl and peroxyketal type peroxides. An example of a commercially available dialkyl peroxide for use as a free radical initiator is 2,5-dimethyl-2,5-di(t-butylperoxy)hexane, available as LUPERSOL 101, from Atofina Chemicals, Inc. Two commercially available peroxyketal peroxides are LUPERSOL 233 and 533, which are examples of t-butyl and t-amyl type peroxides, respectively, and are also available from Atofina Chemicals, Inc.

The choice of peroxide may vary, however, depending upon the particular application and extruder temperatures encountered. Typical extruder temperatures are from about 350° F. to about 550° F. It is important that the extruder temperature or polyethylene melt be above the decomposition temperature of the peroxide. Thus, extruder temperatures will typically be at least 5% or higher than the decomposition temperature of the peroxide being used to ensure complete decomposition. The extruder temperature can be determined using a combination of peroxide half life versus temperature data and the residence time in the extruder as prescribed by the desired throughput.

The peroxide can be added to the polyethylene fluff or powder prior to introduction into the extruder. For polyethylene fluff having a MI2 of 1.0 or greater, it is usually preferable to add the peroxide to the fluff prior to extrusion. In such cases, the peroxide should be thoroughly mixed or dispersed throughout the polymer before being introduced into the extruder. Alternatively, the peroxide can be injected into the polyethylene melt within the extruder. The peroxide is usually added as a liquid, although the peroxide may be added in other forms as well, such as a peroxide coated solid delivery. The peroxide may also be added or combined with the polyethylene prior to or after the polyethylene is fed into the extruder. It is preferable to add liquid peroxide to the melt phase of the polyethylene within the extruder to ensure that the peroxide is completely dispersed. The peroxide may be introduced into the extruder through any means known to those skilled in the art, such as by means of a gear pump or other delivery device. If oxygen or air is used as the initiator, these are preferable injected into the extruder within the polyethylene melt.

The amount of peroxide or initiator necessary to achieve the desired properties and processability may vary. The amount of peroxide or initiator is important, however, in that too little will not achieve the desired effect, while too much may result in undesirable products being produced. Typically, for peroxides, the amounts used are from about 5 to about 100 ppm, with from about 5 to 50 ppm being more typical. A preferred range for peroxide is that from about 5 to about 40 ppm In testing, as illustrated by the examples which follow, improved or increased Theological breadth and improved swell for polyethylene resins having narrow molecular weight distributions were obtained for given polyethylene resins. This was accomplished through the addition of a peroxide as the free radical initiator in appropriate amounts to achieve the increased Theological breadth. Improvements in other characteristics, such as color, were also observed.

For Examples 1–3 presented below, Samples 1–4 were prepared using a polyethylene fluff made from a chromium catalyst, having a polydispersity of 6.5 and weight average molecular weight (Mw) of 125,000. The addition of the free radical initiator in the form of LUPERSOL 101 was accomplished using a small Brabender PL-2000, Plasti-Corder benchtop twin screw extruder (Model D-6). Extrusion conditions were held constant at 40 RPM and a flat temperature profile of 215° C. from the feed section to the strand die was used. Prior to extrusion, fluff was preblended with various levels of peroxide and 450 ppm of the phenolic antioxidant IRGANOX 1076. This condition resulted in a melt temperature of approximately 218° C. and a residence time of approximately 2.5 minutes. The addition of the free radical initiator in accordance with the invention resulted in increased Theological breadth of the polyethylene resin of from about 10% to about 60% compared to unmodified polyethylene resin extruded under similar conditions. The results are presented in Example 1 below.

EXAMPLE 1

|   | PPM Lupersol 101 | % decrease in breadth Parameter (a) | Flow Activation Energy (kcal/mol) |
|---|---|---|---|
| 1 | 0 | 0 | 7.3 |
| 2 | 25 | 20 | 7.8 |
| 3 | 35 | 30 | 8.3 |
| 4 | 50 | 60 | 9.0 |

Increases in Theological breadth of the polyethylene resin, as seen by a decrease in the Theological breadth parameter (a), of from about 10 to about 40% were readily obtainable, without any significant loss or improvement in resin solid state properties including ESCR and stiffness.

Improvements in color of the extruded polyethylene resin samples were also obtained. Specifically, product whiteness was improved, as measured by yellowness index (YI) [ASTM D 1925]. YI is a measure of the magnitude of the yellowness relative to magnesium oxide for CIE Source C. In the present invention, polyethylene products having YI values that were reduced by at least about 10%, compared to material compounded with no peroxide can be obtained, with YI values reduced from about 10% to about 65% being readily obtainable.

The reduction in YI values for Samples 1–4 of Example 1 using different peroxide levels are presented in Example 2 below.

EXAMPLE 2

|   | PPM Lupersol 101 | % Drop in YI |
|---|---|---|
| 1 | 0 | 0 |
| * | 5 | 0 |
| * | 10 | 24 |
| * | 15 | 41 |
| 2 | 25 | 42 |
| 3 | 35 | 61 |
| 4 | 50 | 63 |

*Samples were prepared under same conditions as samples 1–4 using peroxide level as shown.

In addition to the increased rheological breadth, the extrudate swell in the form of parison swell during blow molding was reduced from about 1% to about 5%, as established by layflat data compared to the same polyethylene resins that were not modified with any free radical initiator. Layflat measurements are used as a relative measure of the swell observed during a typical blow molding application. Blow molding experiments were carried out using a Uniloy 250R1 reciprocating screw blow molder. This blow molder had a 2.5 inch screw and diverging tooling used with a 1 gallon round mold. For resin comparison purposes, all blow molder setpoints and conditions with the exception of the weight setting are held constant using the following settings:

TABLE 1

| Bottle Wt(g) | 120 |
|---|---|
| Parison Wt. (g) | 180 |
| RPM | 47 |
| Mold Temp | 34 |
| Cycle Time (sec) | 17.5* |
| Drop Time (sec) | 1.15* |
| Blow Time (sec) | 8 |
| Blow Press | 80 |
| PreBlow Press (psi) | 20 |
| PreBlow Delay (sec) | 0.1 |
| Shot Size % | 35 |
| Die Gap | 5 |
| Feed (F.) | 350 |
| Transition (F.) | 360 |
| Metering (F.) | 360 |
| Nozzle (F.) | 360 |
| Die Block (F.) | 360 |
| Flange (F.) | 360 |
| Head (F.) | 360 |
| Die Tip (F.) | 360 |

*Cycle time and drop time can vary depending on resin properties.
Extruder ram pressure is held constant.

During blow molding, the weight setting is adjusted to account for differences in resin swell such that all bottles have a fixed 120 gram weight. The parison swell is quantified by measuring the width of the layflat (tail flash pinch off width at the point where it contacts the bottle). Experimental repeatability of parison swell is +/−0.2% for the same resin on different runs.

The percentage of parison swell of Samples 1 and 2 prepared as in Example 1 and blow molded as described above are set forth in Example 3 below.

EXAMPLE 3

|   | PPM Lupersol 101 | % Parison Swell |
|---|---|---|
| 1 | 0 | 32.8 |
| 2 | 25 | 27.1 |

Improvements in the processability of the polyethylene resins for use in blow molding applications to produce a final polyethylene product having desired melt properties was also achieved. This was accomplished by the addition of the free radical initiator agent to polyethylene having an initial polymer fluff or powder melt index that was higher than that normally used without modification by the addition of free radical initiator to provide the desired final melt index polymer.

The increased melt index of the initial polyethylene and the increased Theological breadth of the pellets resulted in a polymer that could be used during extrusion and blow molding, providing lower extruder pressures and easier processability, while still obtaining polyethylene resins for blow molding with the desired final melt index and without any significant deterioration of the desired product characteristics. This was achieved while also obtaining reduced swell and improved color of the resultant polyethylene resin, as discussed above.

In order to accomplish this, an unmodified polyethylene resin typically used for blow molding applications without modification, but that provided the desired properties or characteristics, such as a final melt index upon extrusion and/or blow molding, was used as a standard and was modified by a selected amount of free radical initiator, such as those discussed previously. Upon the addition of the free radical initiator to the standard, a drop or decrease in the final melt index of the final polymer was typically observed. Based upon this melt drop, a polyethylene having an initial melt index that would produce a final desired melt index substantially the same or equal to that of the standard could then be selected, as will be more readily apparent in the examples that follow. The selected polyethylene resin would typically have a higher melt flow or index than that of the standard, to accommodate for the melt drop resulting from the addition of the free radical initiator. This allowed better processability and lower extruder pressures than the polyethylene standard, while also improving the resin's Theological breadth, swell and color characteristics.

EXAMPLE 4

A starting polyethylene fluff having an initial MI2 of around 0.7 used in blow molding applications with a desired pellet target MI2 of 0.30, without the addition of a free radical initiator, was treated with varying amounts of peroxide as the free radical initiator. The results are presented in Table 2 below.

TABLE 2

| PPM Lupersol 101 | MI2.16 Kg | % Melt Drop (fluff to pellet) |
|---|---|---|
| fluff | 0.68 | 0 |
| 0 | 0.29 | 53 |
| 5 | 0.29 | 57 |
| 10 | 0.28 | 59 |
| 15 | 0.24 | 65 |
| 25 | 0.22 | 68 |
| 35 | 0.16 | 76 |
| 50 | 0.15 | 78 |

Without initiator, there was an approximate 50% drop in the melt index (% Melt Drop) during compounding. When using a free radical initiator during compounding, the melt drop was increased, and a mathematical relationship between peroxide level and percentage melt drop was developed. Using this relationship a higher initial fluff MI2 was predicted to be required in order to obtain the same target pellet MI2 of around 0.3 as shown:

TABLE 3

35 ppm Lupersol 101

| Fluff MI2.16 Kg | Predicted Pellet MI2.16 kg |
|---|---|
| 1.10 | 0.31 |
| 1.05 | 0.29 |
| 1.00 | 0.28 |
| 0.95 | 0.27 |
| 0.90 | 0.25 |
| 0.85 | 0.24 |
| 0.80 | 0.22 |
| 0.75 | 0.21 |
| 0.70 | 0.20 |
| 0.65 | 0.18 |

At 35 ppm peroxide, the expected melt drop was around 73%. Assuming around 73% melt drop, the required fluff MI2 target was calculated to be approximately 1.05 to produce a final MI2 of around 0.3 using 35 ppm peroxide.

While the examples utilize fluff or powder polyethylene resins as the starting material, the process is just as applicable to the pellet form polyethylene resins that have not been modified by the addition of free radical initiator. The process can be carried out to produce blow molded products, such as bottles, directly from polymer fluff or powder or to convert polyethylene fluffs, powders or unmodified pellets into modified pellets for further processing and use in subsequent blow molding applications.

The following example serves to further illustrate and provide a better understanding of the invention.

EXAMPLE 5

The following four tables are a comprehensive data set for four samples having different peroxide levels and different starting and ending MI's. All samples have the same MWD (D=6.5). These samples were made using a plant extrusion system consisting of a Kobe continuous mixer system. The extrusion conditions consisted of a throughput of approximately 55,000 lb./hr and an orifice temperature of 410 F. Peroxide addition was carried out using a gear pump and delivered just upstream of the hopper in the fluff additive masterbatch mixer. In addition, an antioxidant package consisting of 450 ppm Irganox 1076 was included.

For demonstration purposes, four samples (A–D) were prepared using various levels of LUPERSOL 101, as shown in Table 4. Sample A is a baseline sample containing no peroxide. Sample B was produced using an intermediate level of peroxide and using a starting fluff MI2 equal to that of the baseline. Samples C and D were produced using a fluff MI2 of greater than 1.0. In each sample containing peroxide, the Theological breadth is seen to be increased (lower "a" parameter) relative to sample A and a strong correlation between peroxide level and Theological breadth is seen. In order to produce a product with a pellet MI2 within typical small part blow molding product range, it is clear that a higher fluff MI2 is required. Therefore, in Samples C and D, an initial fluff MI2 of 1.05 was used.

TABLE 4

Sample Details

| ResinID | Lupersol 101 (ppm) | Fluff MI2.16 Kg | Pellet MI2.16 Kg | Rheological Breadth (a) |
|---|---|---|---|---|
| A | 0 | 0.7 | 0.35 | 0.129 |
| B | 30 | 0.7 | 0.23 | 0.097 |
| C | 30 | 1.05 | 0.28 | 0.097 |
| D | 40 | 1.05 | 0.23 | 0.091 |

Samples A–D were blow molded using the conditions outlined in Table 5 and Table 6 on a Uniloy 250R1 reciprocating screw blow molder. In each case all blow molding conditions were held constant with the exception of the weight setting. The weight setting is adjusted in order to achieve a constant bottle weight of 120 grams.

TABLE 5

Blow Molding Conditions Heat Settings

| ResinID | Feed (F.) | Transition (F.) | Metering (F.) | Nozzle (F.) | Die Block (F.) | Flange (F.) | Head (F.) | Die Tip (F.) |
|---|---|---|---|---|---|---|---|---|
| A | 350 | 360 | 360 | 360 | 360 | 360 | 360 | 360 |
| B | 350 | 360 | 360 | 360 | 360 | 360 | 360 | 360 |
| C | 350 | 360 | 360 | 360 | 360 | 360 | 360 | 360 |
| D | 350 | 360 | 360 | 360 | 360 | 360 | 360 | 360 |

TABLE 6

Blow Molding Conditions

| ResinID | RPM | Blow Time (sec) | Blow Press | PreBlow Press (psi) | PreBlow Delay (sec) | Shot Size % | Weight Setting % | Die Gap % |
|---|---|---|---|---|---|---|---|---|
| A | 47 | 8 | 80 | 20 | 0.1 | 35 | 10.87 | 5 |
| B | 47 | 8 | 80 | 20 | 0.1 | 35 | 11.45 | 5 |
| C | 47 | 8 | 80 | 20 | 0.1 | 35 | 11.3 | 5 |
| D | 47 | 8 | 80 | 20 | 0.1 | 35 | 11.9 | 5 |

Measurements of bottle tail flash layflat as a quantification of parison swell indicate a strong correlation of resin Theological breadth and therefore peroxide level as shown in Table 7. A 4.5% reduction in swell was observed between the product containing no peroxide (Sample A) and that containing 40 ppm of Lupersol 101 (Sample D).

TABLE 7

Blow Molding Results Including Swell

| ResinID | Bottle Wt. (g) | Parison Wt. (g) | Tail Wt (g) | LayFlat (mm) | % Swell |
|---|---|---|---|---|---|
| A | 119.8 | 179.0 | 32.7 | 138.9 | 32.0 |
| B | 120.4 | 178.7 | 32.9 | 135.8 | 29.0 |
| C | 119.8 | 180.1 | 35.3 | 135.5 | 28.8 |
| D | 120.0 | 180.5 | 36.1 | 134.2 | 27.6 |

In addition to the reduction in swell achieved in samples containing peroxide relative to that containing no peroxide, a dramatic improvement in processing performance is achieved in terms of throughput potential. Throughput potential was quantified by the melt pressure and parison drop time measured for each resin using a fixed hydraulic extrusion pressure setting. It can be seen in Table 8 that resins modified using peroxide have a significantly lower parison drop time and extrusion melt pressure than those which were not modified. This observation is in contrast to the expectations based on pellet MI2 for the samples.

TABLE 8

Blow Molding Throughput Potential

| ResinID | Melt Temp (F.) | Melt Press (psi) | Motor Load (amps) | Mold Temp (F.) | Cycle Time (sec) | Drop Time (sec) |
|---|---|---|---|---|---|---|
| A | 372 | 5404 | 49 | 34 | 17.2 | 1.138 |
| B | 375 | 5524 | 51 | 33 | 16.8 | 1.152 |
| C | 374 | 5289 | 47 | 32 | 17.2 | 1.08 |
| D | 373 | 5288 | 47 | 34 | 17.1 | 1.107 |

The improved throughput potential of the peroxide modified resins was also demonstrated by operating the blow molder in purge mode. In purge mode, the molder extrudes resin continuously and the pressure and throughput were measured and compared by using a fixed die gap. It can be seen that under these conditions, those samples which are peroxide modified and were made using a high fluff MI2 have significantly reduced extrusion pressures for a fixed die gap and screw RPM.

The invention provides several advantages over the prior art. The method of the invention improves or increases the Theological breadth of the polyethylene resins. Such modification improves swell characteristics and processability of the polyethylene, particularly polyethylene having narrow molecular weight distribution. The addition of the free radical initiator also results in improved color of the final polyethylene resin. The method of the invention also allows the use of polyethylene resins as starting materials having higher melt indices, while still achieving a desired final melt index that would otherwise necessitate the use of resins having lower melt indices. This allows easier processability and results in lower extruder pressures.

While the invention has been shown in only some of its forms, it should be apparent to those skilled in the art that it is not so limited, but is susceptible to various changes and modifications without departing from the scope of the invention. Accordingly, it is appropriate that the appended claims be construed broadly and in a manner consistent with the scope of the invention.

We claim:

1. A method of processing polyethylene for use as an extruded blow molding resin to improve the color properties thereof, the method comprising modifying a polyethylene resin by the addition of a free radical initiator to the resin during extrusion of the resin to obtain a polyethylene resin having a YI value that is reduced by at least about 10% compared to unmodified polyethylene resin extruded under similar conditions.

2. A method of processing polyethylene comprising modifying a polyethylene resin by the addition of a free radical initiator to the resin during extrusion of the resin to obtain a polyethylene resin having a YI value that is reduced by at least about 10% compared to unmodified polyethylene resin extruded under similar conditions.

3. The method of claim 2, wherein the YI value is reduced from about 10% to about 65%.

4. The method of claim 2, wherein the polyethylene resin has a melt flow index of at least 1 or greater prior to extrusion.

5. The method of claim 2, wherein the free radical initiator is added to the polyethylene resin while the polyethylene resin is in a molten state during extrusion.

6. The method of claim 2, wherein the free radical initiator is a peroxide in the amount of from 5 to 100 ppm.

7. The method of claim 2, wherein the free radical initiator is selected from a group consisting of a peroxide, oxygen, air and an azide.

8. The method of claim 2, wherein the free radical initiator is a peroxide in the amount of from 5 to 25 ppm.

TABLE 9

Continuous Extrusion Throughput Data at Constant Die Gap

| ResinID | RPM | Motor Load (amps) | Melt Press (psi) | Melt Temp (F.) | grams/min | RPM | Motor Load (amps) | Melt Press (psi) | Melt Temp (F.) | grams/min |
|---|---|---|---|---|---|---|---|---|---|---|
| A | 47 | 50 | 2036 | 374 | 570 | 95 | 69 | 2660 | 375 | 1221 |
| B | 47 | 51 | 2072 | 375 | 583 | 95 | 68 | 2666 | 377 | 1188 |
| C | 47 | 49 | 1782 | 374 | 577 | 95 | 67 | 2441 | 377 | 1252 |
| D | 47 | 48 | 1867 | 375 | 589 | 95 | 66 | 2501 | 379 | 1228 |

9. The method of claim 2, wherein the polyethylene resin is a chromium-catalyst-produced polyethylene resin.

10. A polyethylene product prepared by the method of claim 2.

11. The method of claim 2, wherein the polyethylene resin includes polyethylene and ethylene copolymers of $C_3$ to $C_{10}$ alpha-olefins.

12. The method of claim 2, wherein the polyethylene resin is a blow molding resin.

13. The method of claim 2, wherein the polyethylene resin has a molecular weight distribution (Mw/Mn) of less than about 10.

14. The method of claim 2 wherein the free radical initiator is radiation.

15. The method of claim 2, wherein the free radical initiator is a chemical-based free radical initiator.

* * * * *